US011089453B2

(12) United States Patent
Sanghavi et al.

(10) Patent No.: US 11,089,453 B2
(45) Date of Patent: Aug. 10, 2021

(54) CREATION AND CONSUMPTION OF TRANSIENT USER PROFILES

(71) Applicant: Apple Inc., Cupertino, CA (US)

(72) Inventors: Mehul K. Sanghavi, San Jose, CA (US); Michael Froimowitz Greenzeiger, Sunnyvale, CA (US); Ravindra M. Phulari, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1132 days.

(21) Appl. No.: 14/313,859

(22) Filed: Jun. 24, 2014

(65) Prior Publication Data

US 2015/0373091 A1 Dec. 24, 2015

(51) Int. Cl.
*G06F 15/16* (2006.01)
*H04W 4/21* (2018.01)
*H04W 4/80* (2018.01)

(52) U.S. Cl.
CPC .............. *H04W 4/21* (2018.02); *H04W 4/80* (2018.02)

(58) Field of Classification Search
CPC ............................. H04W 4/008; H04W 4/206
USPC ........................................................ 709/204
See application file for complete search history.

(56) References Cited

U.S. PATENT DOCUMENTS

| 8,782,122 B1* | 7/2014 | Chang ................. H04L 67/1048 709/202 |
| 2003/0220977 A1* | 11/2003 | Malik ................. H04L 61/3065 709/206 |
| 2004/0054923 A1* | 3/2004 | Seago ................... H04L 63/102 726/4 |
| 2006/0036748 A1* | 2/2006 | Nusbaum .......... G06F 17/30867 709/228 |
| 2008/0140650 A1* | 6/2008 | Stackpole ........... G06F 17/3087 |
| 2008/0207263 A1* | 8/2008 | May .................. H04M 1/72566 455/556.2 |
| 2012/0311462 A1* | 12/2012 | Devecka ................. H04W 4/21 715/753 |

* cited by examiner

*Primary Examiner* — Normin Abedin
(74) *Attorney, Agent, or Firm* — Aikin & Gallant, LLP

(57) ABSTRACT

Transient user profiles are generated and broadcast to nearby recipient devices. In some implementations, a transient user profile is generated from a master user profile that includes user information. The master user profile can be stored in encrypted form on the user's mobile device or on a network-based computer system where it can be accessed upon authentication. The master user profile can include information provided by the user or retrieved from other network-based computer systems. The master user profile can include information that is labeled with security tags that indicate the class of users that may receive the user information. From the master user profile, a transient user profile can be generated in response to a sharing event and broadcast to other nearby recipient devices.

30 Claims, 6 Drawing Sheets

CREATION AND CONSUMPTION OF TRANSIENT USER PROFILES

TECHNICAL FIELD

This disclosure relates generally to peer-to-peer communications.

BACKGROUND

There are situations in which a person may wish to share information about themselves with others who they may or may not know personally. For example, in business situations a person may wish to share their job and contact information with colleagues within or outside of their company through the use of vCards or traditional business cards. There are other situations in which the person may desire to share information, such as school groups, social clubs and the like. Depending on the context and the identity of the recipient to whom the information is to be shared, there can be different requirements for what information would be appropriate to share and of interest to the recipient. In situations where the information to be shared is secure or private, such information should only be accessible by the intended recipient.

SUMMARY

Transient user profiles are generated and broadcast to nearby recipient devices. In some implementations, a transient user profile is generated from a master user profile that includes user information. The master user profile can be stored in encrypted form on the user's mobile device or on a network-based computer system where it can be accessed upon authentication. The master user profile can include information provided by the user or retrieved from other network-based computer systems. The master user profile can include user information that is labeled with security tags that indicate a class of recipients that may receive the user information. From the master user profile, a transient user profile can be generated in response to a sharing event and broadcast to other nearby recipient devices.

The sharing event can be triggered based on user input or based on the user's current location. In response to a sharing event, a transient user profile is generated from user information contained in the master user profile that is relevant to the sharing event. The transient user profile can be configured to expire after a period of time or in response to termination of the sharing event. In some implementations, a sharing event terminates when the user crosses a geofenced boundary or destroys the transient user profile. Additionally, the user can specify whether some or all of the information in the transient user profile will persist on a recipient device or network-based storage. Information in the transient user profile that persists can retain its security tag, if any, so that only a certain class of recipients can receive and retain the security tagged information.

In some implementations, a user can specify templates for generating transient user profiles that include pre-populated fields. The user can specify for a given profile template a minimum or maximum geographic distance from a recipient device before the transient user profile can be shared with the recipient device. In some implementations, the user can specify for a given profile template whether some, or all, of the user information contained in the transient user profile can be shared by the recipient device with other devices, directly or indirectly, over a network.

In some implementations, a view of received transient user profiles can be presented on a recipient's mobile device sorted by distance in ascending or descending order. The user can operate a graphical user interface (GUI) element on the recipient device to increase or decrease the distance of a geofenced boundary. The view can be updated when a sending device enters or exits the geofenced boundary.

In some implementations, transient user profiles can be presented on a recipient device in a camera view. The user of a recipient device can scan the environment with their camera and each individual captured in the camera view will have their image augmented with their transient user profile, allowing the user of the recipient device to visually match an individual with their respective transient user profile.

In some implementations, a method comprises: determining, by a mobile device, a sharing event; generating a transient user profile based on the sharing event; and broadcasting the transient user profile to one or more recipient devices in communication range of the mobile device.

In some implementations, a method comprises: receiving, by a mobile device, multiple transient user profiles from sending devices in communication range of the mobile device; sorting the transient profiles based on distance from the mobile device; and displaying the transient user profiles on the mobile device in sorted order.

Other implementations are directed to systems, devices and non-transitory, computer-readable storage mediums. Particular implementations disclosed herein provide one or more of the following advantages. Users can generate a transient user profile on their mobile device that includes user information that is selected from a master user profile and then broadcast the transient user profile to a specified class of recipients, thus insuring that contextually relevant user information is broadcast to individuals who have interest in receiving the user information and/or keeping the user information confidential and secure. Pre-populated template user profiles facilitate the generation of transient user profiles from the master user profile. GUI views enable a recipient device to present multiple transient user profiles from different users in order by distance, including a user interface element for dynamically adjusting the number of transient user profiles that can be displayed in the GUI.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Operating Environment

Figure 1:
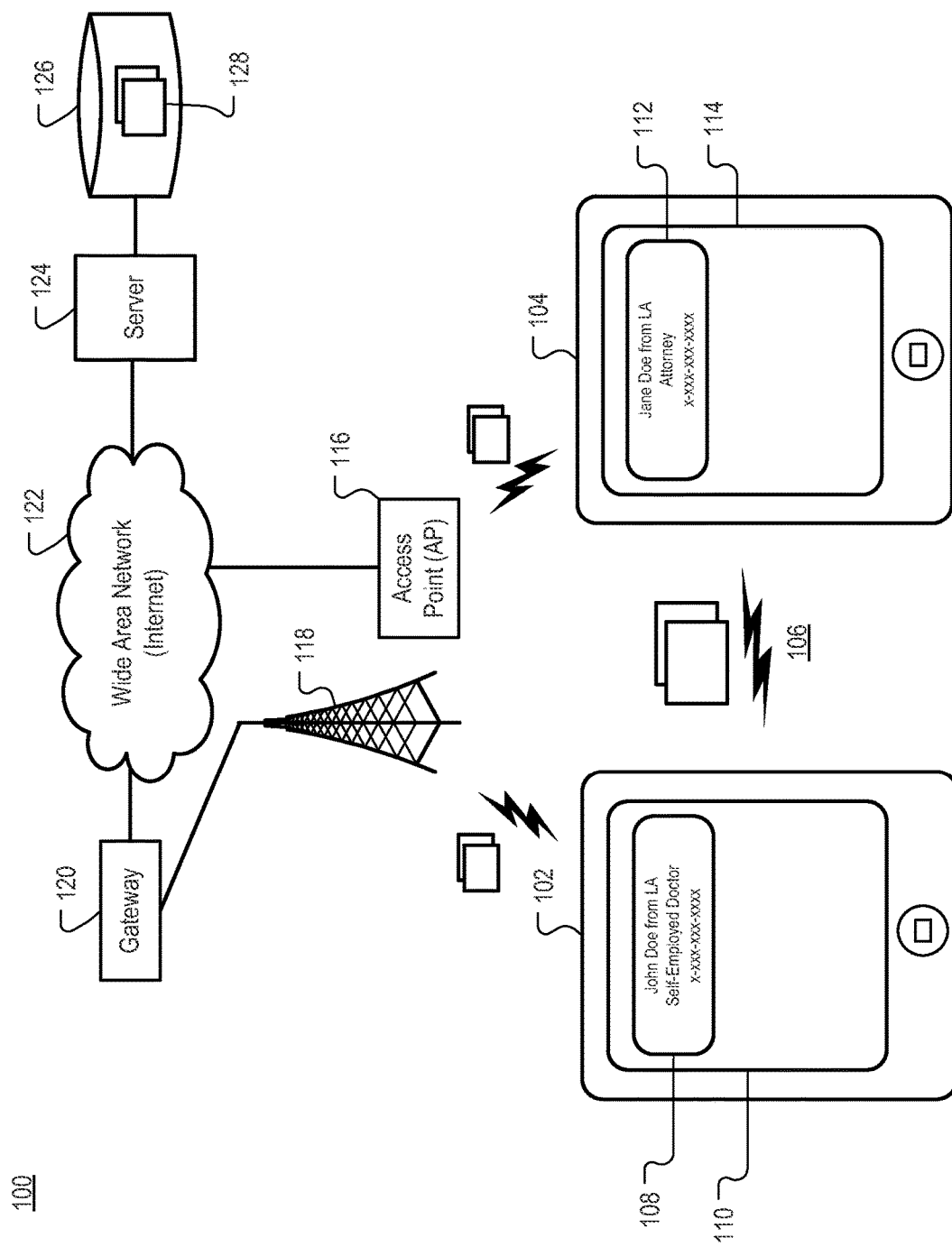
FIG. 1 illustrates an operating environment for creating and consuming transient user profiles.

FIG. 1 illustrates an operating environment 100 for creating and consuming transient user profiles. In some implementations, operating environment 100 can include mobile devices 102, 104 (e.g., smart phone, tablet computer, laptop, wearable computer), which are configured to communicate with each other over a short range communication link 106 (e.g., Bluetooth, Near Field Communication (NFC)) and with server 124 through access point 116 (e.g., a WiFi router) and network 122 (e.g., the Internet) or cell tower 118 (e.g., 3G, 4G), gateway 120 and network 122. Server 124 can be coupled to database 126, which stores master user profiles 128.

When mobile devices 102, 104 are in communication range of each other mobile devices 102, 104 broadcast respective transient user profiles 108, 112 over short range communication link 106. Transient profiles 108, 112 are displayed on respective graphical user interfaces (GUIs) 110, 114 of mobile devices 102, 104. Transient user profiles 108, 112 can be generated from master user profiles 128. The display of transient user profiles 108, 112 on a recipient device is described further with respect to FIG. 2.

In some implementations, a master user profile includes one or more files that contain information about the user that the user would potentially want to share with others in a transient user profile. The master user profile can be stored in encrypted form directly on the user's mobile device and/or on a network-based computer system. The master profile can be accessed using one or more authentication methods, including but not limited to a password, hardware dongle/key or biometrics. The master profile can include information entered by the user through an input device (e.g., computer, smartphone) or automatically retrieved from other network-based computer systems, such as corporate human resource records, medical records, school records, financial records and the like. Automatic retrieval would only occur after the user has opted in to sharing such personal information.

In some implementations, the master profile can be a database table that includes fields for storing personal information. The fields can be labeled with security tags specifying one or more classes of recipients that may receive certain user information in a transient user profile. For example, in a work context, user information can disclose projects that the user is currently working on for her employer and the class of recipients can be other employees who are disclosed on the projects and authorized by the employer to receive the project information. In a medical context, the user information can disclose medical records and the class of recipients can be close relatives or health care professionals. This health class can be useful in emergency situations where a medical responder receives a transient user profile on their mobile device that is broadcast from an injured person's mobile device and the transient user profile includes critical medical information (e.g., current prescriptions, existing medical conditions, allergies). In a social context, user information can disclose a user's interest (e.g., hobbies, sports, likes/dislikes, dating preferences) and the class of recipients can include friends or other individuals whom share the interests of the user.

In some implementations, a transient user profile is generated from the master user profile and broadcast to nearby recipient devices during a sharing event. A sharing event is any event where the user's mobile device is in communication range of at least one recipient device and other specified criteria defining a specific sharing context are met. For example, the sharing context can be input from the user or determined from the user's current location, which can be determined using one or more positioning technologies, such as WiFi, cell tower, Global Navigation Satellite Systems (GNSS), such as Global Positioning System (GPS) and radio frequency (RF) beacons (e.g., Bluetooth low energy beacons).

Based on the context, a transient user profile may be configured to have a limited time-to-live. For example, a transient user profile can be configured to expire (e.g., destroy itself) for a user specified period of time (e.g., 1 minute, 1 hour, 1 day). The transient user profile can be configured to expire when the broadcasting mobile device exits a geofenced boundary specified by the user or until the user deliberately destroys the profile (e.g., deletes the profile from their mobile device). In some implementations, the user can specify whether some or all the user information contained in a transient user profile will persist on a recipient device or other storage location (e.g., network-based storage system). In some implementations, the user information may include security tagging so that only recipients who are members of the specified class may receive all or portions of the user information.

In some implementations, a user can specify template user profiles for generating transient user profiles with pre-populated data fields. For example, templates can be generated for professional, dating, medical, school, etc. Users can also define geographic distances (e.g., radial distances) associated with given profile templates. For example, a user can broadcast a give transient user profile only to recipient devices that are 1 foot, 10 feet or 1 mile away from the sending device. In addition to be shared by proximity, users can also specify which template user profiles can be shared with other individuals over, for example, corporate intranets, social networks or other network-based computing systems. If a transient user profile is to be shared, any security tags associated with the transient user profile can be carried with the transient user profile to ensure that only the class of recipients designated by the security tag can receive the transient user profile and access the secure or private user information.

Example Graphical User Interface

Figure 2A:
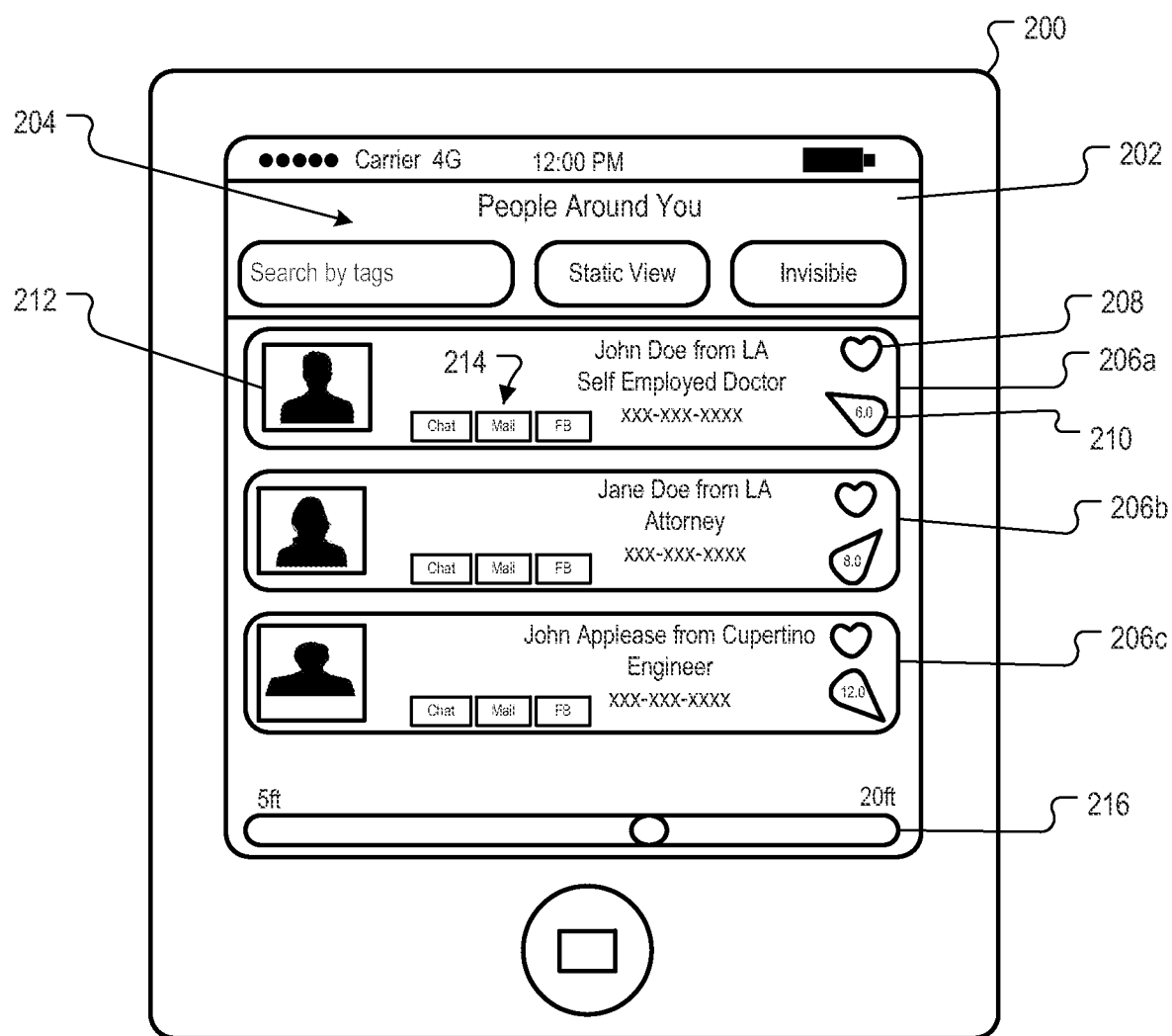
FIG. 2A illustrates a graphical user interface presenting a listing view of transient user profiles.

FIG. 2A illustrates a GUI 202 presenting a listing view of transient user profiles on mobile device 200. In normal operation, GUI 202 (e.g., a scroll panel) is dynamically updated with transient user profiles 206a-206c each time a sending device enters a geofenced boundary around mobile device 200. For example, the user can be standing in the middle of a room filled with people each of which is broadcasting a transient user profile configured with information that the person wants to share with other people in the room. The user of mobile device 200 will see GUI 202 presented on the screen of mobile device 200 with transient user profiles displayed in ascending (as shown) or descending order based on increasing or decreasing distance between mobile device 200 and the given sending device. In the example shown, John Doe is closest to mobile device 200 (e.g., 6 feet), Jane Doe is the next closest to mobile device 200 (e.g., 8 feet) and John Applease is the furthest from mobile device 200 (e.g., 12 feet).

As new sending devices enter communication range of mobile device 200, the new transient profiles are added to the listing at the appropriate location in the listing according to distance. The distance to a given sending device can be determined by mobile device 200 based on a received signal strength indication (RSSI) or any other known ranging technique. In some implementations, the sending device can send its current location (e.g., computed with a GNSS system) with the transient user profile. The current location of the sending device can be differenced with the current position of mobile device 200 to determine the distance between the two devices.

In some implementations, GUI 202 includes a control portion 204 that includes a search field for searching for transient user profiles by tags. The search field allows the user to search through a number of transient user profiles received and stored on mobile device 200. Various search queries can be input by the user and a search engine on mobile device 200 can search a data store (e.g., cache memory) on mobile device 200 for transient user profiles that meet the search query.

Portion 204 also includes user interface elements (e.g., virtual buttons) for providing a static view and invisible mode. The static view element can be selected by the user to stop or "freeze" the updating of GUI 202. The invisible element can be selected by the user to stop the receipt of transient user profiles broadcast by sending devices, thus making mobile device 200 "invisible" to sending devices.

In some implementations, transient profiles 206a-206c can include one or more user interface elements 214 for selecting a mode of communication with a sending device, including but not limited to user interface elements (e.g., virtual buttons) for text messaging, e-mail communication and connecting to a social network. In some implementations, user interface element 208 can indicate (e.g., with an icon) the class of recipients authorized to receive the transient user profile. In some implementations, user interface element 210 can indicate the distance or direction of a sending device relative to mobile device 200.

In some implementations, a proximity selector 216 can be used to dynamically increase or decrease the number of transient user profiles that are received and displayed in GUI 202. In the example shown, proximity selector 216 can be manipulated by the user to increase or decrease the radial distance of a geofence boundary around mobile device 200 to include more or fewer transient user profiles listed in GUI 202. For example, a sending device within 10 to 30 feet of mobile device 200 will have its transient user profile listed in GUI 202. Accordingly, if the user is viewing transient user profiles for sending devices within 10 feet of mobile device 200, then the list in GUI 202 would be updated anytime a sending device entered or exited the 10 foot geofenced boundary. Proximity selector 216 can have a minimum and a maximum distance boundary. The minimum distance boundary can be small (e.g., 5 feet) and can be customized by the user in a settings pane or menu. The maximum distance boundary can be controlled by the number of sending devices in the vicinity and received signal strengths from the sending devices. For example, the sending device with the weakest received signal strength (e.g., as indicated by RSSI) would likely be the maximum distance from the recipient device. The distance of that sending device can be the maximum distance boundary of proximity selector 216. The minimum and maximum distances can be labeled on the proximity selector, as shown in FIG. 2A.

Figure 2B:
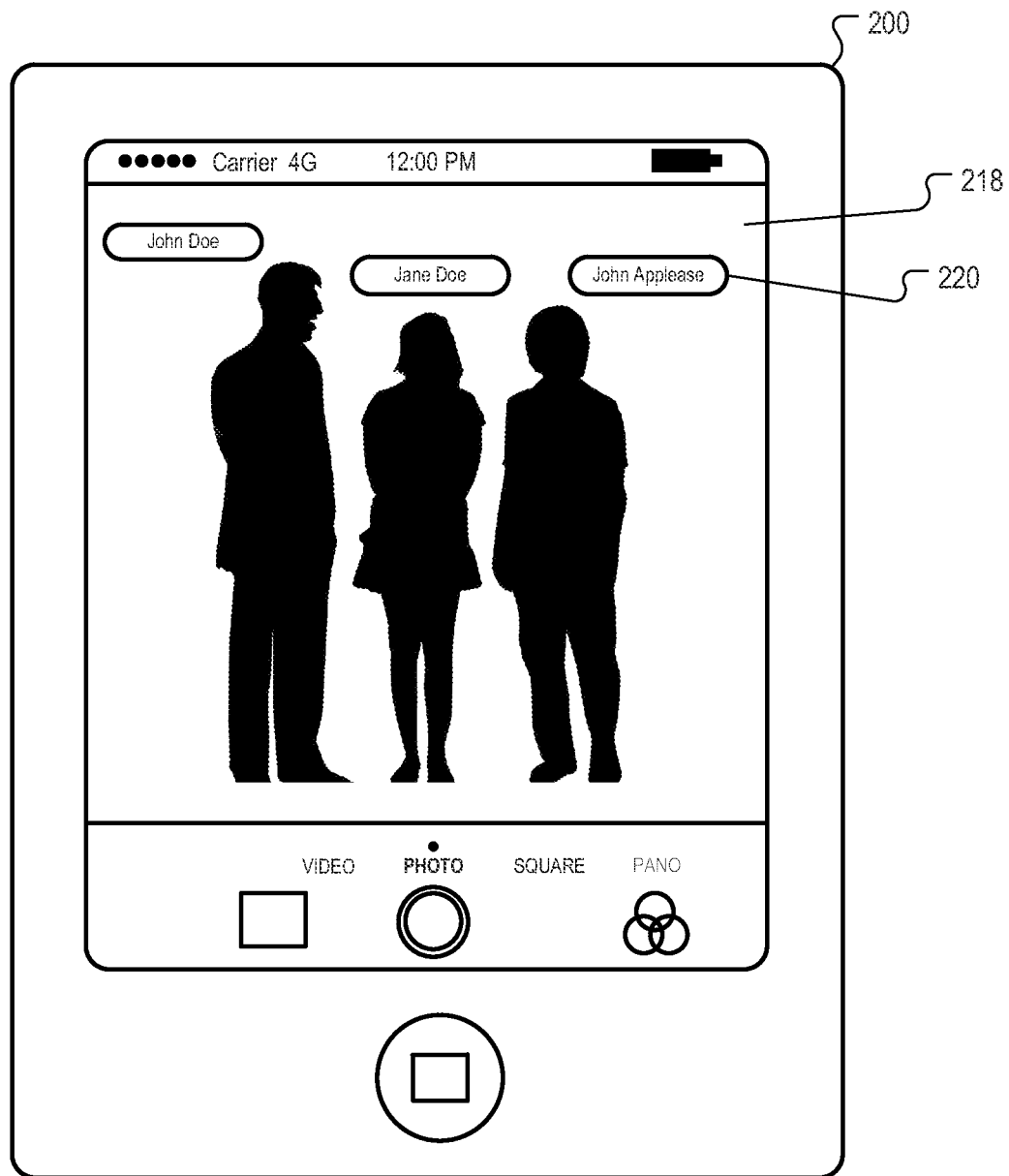
FIG. 2B illustrates a graphical user interface presenting a camera view of transient user profiles.

FIG. 2B illustrates a graphical user interface presenting camera view 218 of transient user profiles using a mobile device with an embedded camera. Camera view 218 can be provided by a camera application running on mobile device 200. For example, camera view 218 can be a live video feed. While in camera view 218, the user can scan a room full of people with the embedded camera turned on to capture images of the people in the live video feed with their transient user profiles 220 overlaid and proximate to their images. In camera view 210 the user can visually match a person captured in the video feed with their corresponding transient user profile received by mobile device 200. In some implementations, known facial recognition techniques (e.g., Principal Component Analysis using eigenfaces, Linear Discriminate Analysis, Elastic Bunch Graph matching using the Fisherface algorithm, Hidden Markov Model, Multilinear Subspace Learning using tensor representation and neuronal motivated dynamic link matching) can be used to match faces captured in live video with digital photos in transient user profiles to determine where to overlay the transient user profile in the camera view. In implementations where there are no profile facial images available, or for some other reason a match is not detected, the transient user profile can be displayed in the GUI at an angle that is substantially parallel with a line-of-sight vector from the recipient device to the sending device (in two-dimensional screen coordinates) based on a location reported by the sending device over the communication link and the current location of the recipient device. Additionally, known face detection algorithms can be used to avoid overlaying the transient user profile on the image of the individual captured in the camera view.

Example Processes

Figure 3A:
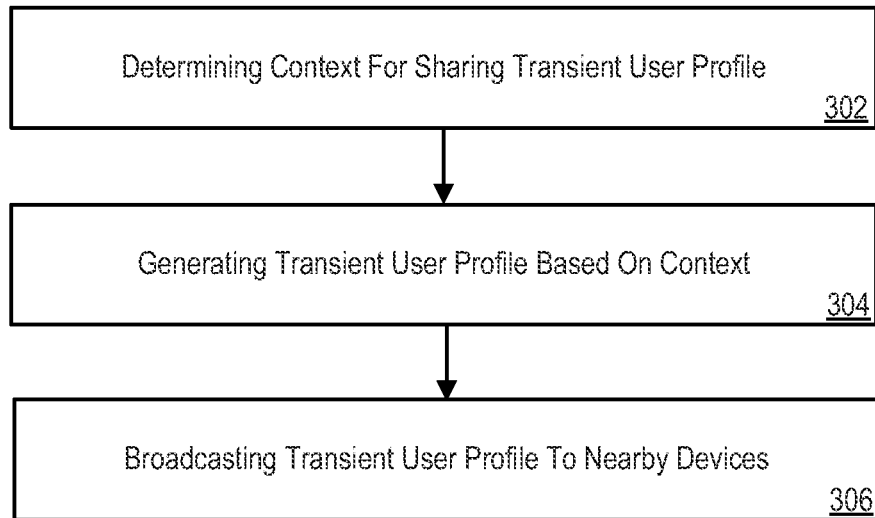
FIG. 3A is a flow diagram of example process for creating transient user profiles.

FIG. 3A is a flow diagram of example process 300 for creating transient user profiles. Process 300 can be implemented by the client architecture described in reference to FIG. 4.

In some implementations, process 300 can begin by determining a context for sharing a transient user profile (302). The context can be, for example, based on proximity or distance from one or more recipients that are candidates for receiving a transient user profile. A recipient is a candidate if the recipient is located within a specified distance (e.g., radial distance) of the sending device and the recipient is a member of the class that is authorized to receive the transient user profile based on any security tags or other specifications.

Process 300 can continue by generating a transient user profile based on the determined context (304). For example, the transient user profile can be generated with user information contained in a master user profile, which can be encrypted and stored on the sending device or a network-based computer system. The transient user profile can be based on a template user profile with pre-populated data fields. One or more data fields can be labeled with a security tag that can limit the class of recipients who can receive the transient user profile. The transient user profile can be configured with a time-to-live, after which time the transient user profile is destroyed. In some implementations, transient user profiles received on recipient devices can destroy itself after a period of time expires or termination of a sharing event. For example, a transient user profile can be configured to destroy itself when the recipient device is a specified distance from the sending device or outside a geofenced boundary set by the sending device.

Process 300 can continue by broadcasting the transient user profile to nearby recipient devices (306). The transient user profile can be broadcast to nearby recipient devices over a wireless communications link, such as Bluetooth or NFC.

Figure 3B:
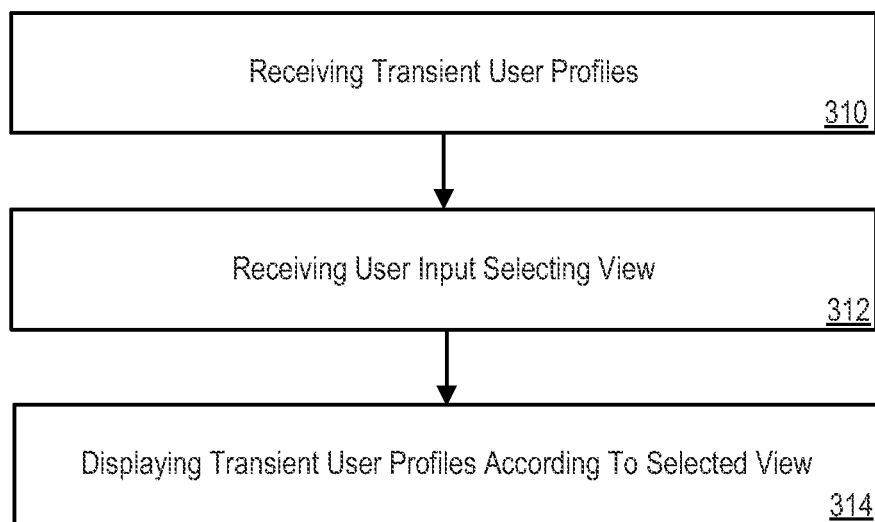
FIG. 3B is a flow diagram of an example process for consuming transient user profiles.

FIG. 3B is a flow diagram of an example process 308 for consuming transient user profiles. Process 308 can be implemented by the client architecture described in reference to FIG. 4.

In some implementations, process 308 can begin by receiving transient user profiles from nearby devices over a wireless communications link (310). For example, a recipient device can receive one or more transient user profiles from one or more mobile devices that are in communication range of the recipient device. The transient user profiles received can include security tags and other metadata that determines time-to-live or whether the transient user profile will persist on the recipient device and/or can be shared with other recipient devices.

Process 300 can continue by receiving user input selecting a view (312) and displaying the transient user profiles according to the selected view (314). In some implementations, users of recipient devices can select from a number of GUI views for display received transient user profiles broadcast over a wireless communications link. One example view can be listing of transient user profiles in ascending or descending order based on distance from the sending device. Another example view is camera view that allows the user to use an embedded camera on the sending device to capture images of persons in the local environment in a live video feed and augment the images with their respective transient user profiles.

Example Client Architecture

Figure 4:
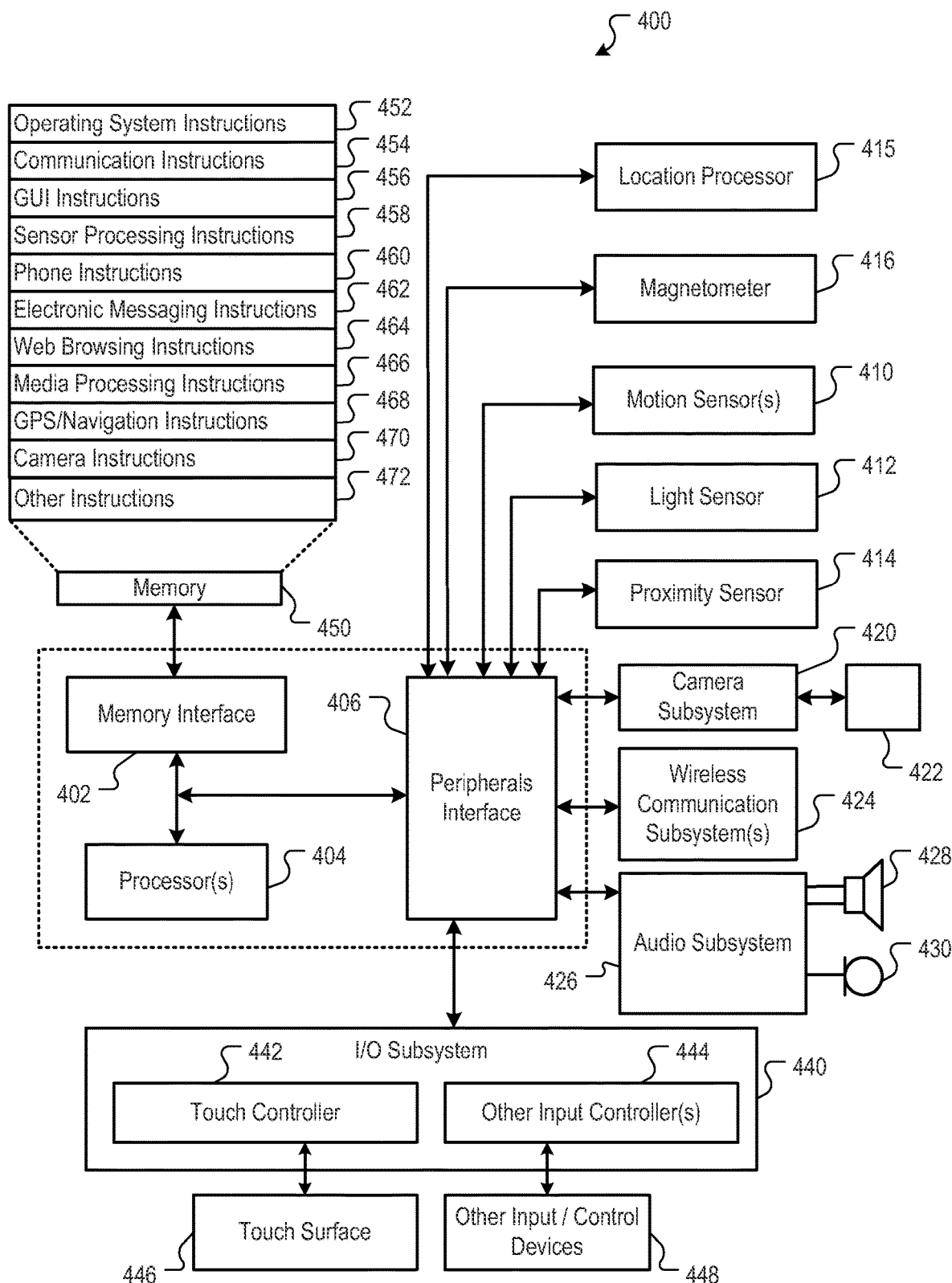
FIG. 4 is a block diagram of example client device architecture for implementing the features and processes described in reference to FIGS. 1-3.

FIG. 4 is a block diagram of example client device architecture for implementing the features and processes described in reference to FIGS. 1-3.

Architecture 400 may be implemented on a mobile device for implementing the features and processes described in reference to FIGS. 1-3, including but not limited to portable computers, smart phones, tablet computers, game consoles, wearable computers and the like. Architecture 400 may include memory interface 402, data processor(s), image processor(s) or central processing unit(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 406, such as a temperature sensor, a biometric sensor, or other sensing device, to facilitate related functionalities.

Location processor 415 (e.g., GPS receiver chip) may be connected to peripherals interface 406 to provide georeferencing. Electronic magnetometer 416 (e.g., an integrated circuit chip) may also be connected to peripherals interface 406 to provide data that may be used to determine the direction of magnetic North. Thus, electronic magnetometer 416 may be used with an electronic compass application.

Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 424. Communication subsystem(s) 424 may include one or more wireless communication subsystems. Wireless communication subsystems 424 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 424 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax), code division multiple access (CDMA) networks, NFC and a Bluetooth™ network. Wireless communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 426 may be coupled to a speaker 428 and one or more microphones 430 to facilitate voice-enabled functions, such as voice recognition, voice replication, digital recording, and telephony functions.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices, one or more computers or servers, including peer-to-peer communications. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and other instructions 472 for performing some or all of the processes, as described in reference to FIGS. 1-3.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

Example Server Architecture

Figure 5:
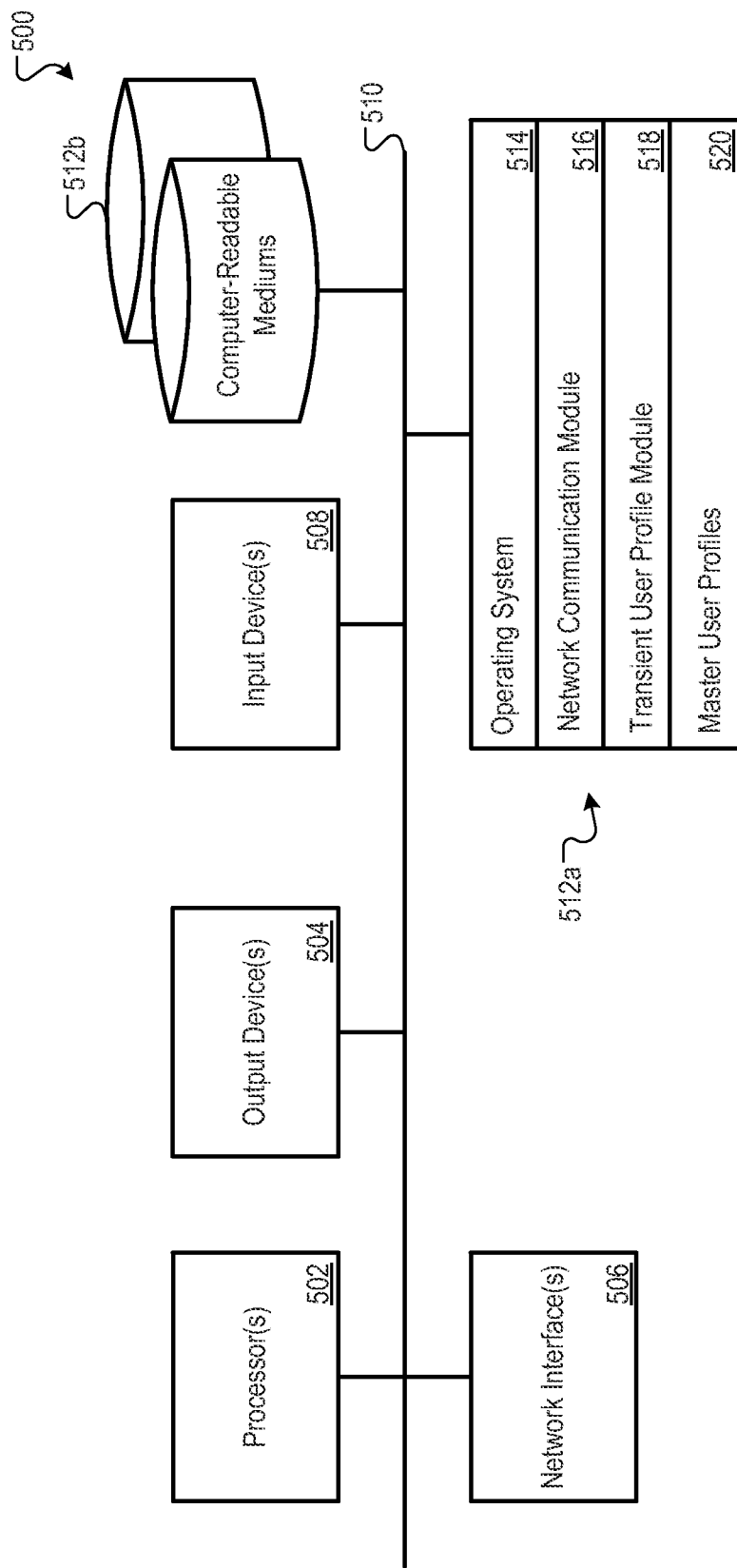
FIG. 5 is a block diagram of example server computer architecture for implementing the features and processes described in reference to FIGS. 1-3.

FIG. 5 is a block diagram of example server architecture for implementing the features and processes described in reference to FIGS. 1-3. Other architectures are possible, including architectures with more or fewer components. In some implementations, architecture 500 includes one or more processors 502 (e.g., dual-core Intel® Xeon® Processors), one or more output devices 504 (e.g., LCD), one or more network interfaces 506, one or more input devices 508 (e.g., mouse, keyboard, touch-sensitive display) and one or more computer-readable mediums 512*a*-*b* (e.g., RAM, ROM, SDRAM, hard disk, optical disk, flash memory, etc.). These components can exchange communications and data over one or more communication channels 510 (e.g., buses), which can utilize various hardware and software for facilitating the transfer of data and control signals between components.

The term "computer-readable medium" refers to any medium that participates in providing instructions to processor 502 for execution, including without limitation, non-volatile media (e.g., optical or magnetic disks), volatile media (e.g., memory) and transmission media. Transmission media includes, without limitation, coaxial cables, copper wire and fiber optics.

Computer-readable mediums 512*a*-*b* can further include operating system 514 (e.g., Mac OS® server, Windows® NT server), network communication module 516, analytics module 518 and map services module 520. Operating system 514 can be multi-user, multiprocessing, multitasking, multithreading, real time, etc. Operating system 514 performs basic tasks, including but not limited to: recognizing input from and providing output to devices 506, 508; keeping track and managing files and directories on computer-readable mediums 512*a*-*b* (e.g., memory or a storage device); controlling peripheral devices; and managing traffic on the one or more communication channels 510. Network communications module 516 includes various components for establishing and maintaining network connections (e.g., software for implementing communication protocols, such as TCP/IP, HTTP, etc.). Transient user profile module 518 includes instructions for implementing the features and processes described in reference to FIGS. 1-3. Master user profiles 520 are also described in reference to FIGS. 1-3.

Architecture 500 can be included in any computer device, including one or more server computers each having one or more processing cores. Architecture 500 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, by a mobile device, a sharing event with a set of recipient devices that are in peer-to-peer wireless communication range of the mobile device;

generating, by the mobile device, a transient user profile based on the sharing event, the transient user profile including user profile information comprising one or more data fields labeled with a security tag that defines a subset of recipient devices in the set of recipient devices that are authorized to receive the user profile information, wherein the transient user profile is configured by the mobile device to be deleted from a recipient device of the subset of recipient devices after the recipient device moves a specified distance from the mobile device; and broadcasting, by a wireless transceiver of the mobile device, the transient user profile to the subset of recipient devices.

2. The method of claim 1, where the sharing event is determined based on a current geographic location of the mobile device.

3. The method of claim 2, where the sharing event is determined by a crossing by the mobile device of a geofenced boundary.

4. The method of claim 1, where generating a transient user profile further comprises:
generating the transient user profile by selecting user information from a master user profile.

5. The method of claim 4, where the master user profile is encrypted and stored on the mobile device.

6. The method of claim 4, where the master user profile is labeled with at least one security tag indicating at least one class of recipients of the selected user information.

7. The method of claim 1, where generating a transient user profile further comprises:
generating the transient user profile from a template user profile with at least one pre-populated data field.

8. The method of claim 7, where the user can specify a geofenced boundary for the template user profile.

9. The method of claim 1, where the transient user profile is configured to restrict sharing of the transient user profile by the one or more recipient devices with other devices according to the security tag carried with the transient user profile.

10. The method of claim 1, wherein the transient user profile is additionally configured by the mobile device to be deleted from a recipient device of the subset of recipient devices after expiration of a specified period of time or after the recipient device in the subset of recipient devices moves outside a geofenced boundary set by the mobile device.

11. A method comprising:
receiving, by a mobile device during a sharing event, multiple transient user profiles from sending devices that are in peer-to-peer wireless communication range of the mobile device, at least one of the multiple transient user profiles configured to be deleted from storage of the mobile device after the mobile device moves a specified distance from a sending device;
receiving, by the mobile device, a user input selecting a selected view for the multiple transient user profiles;
sorting the transient profiles based at least in part on the user input;
displaying, on a display of the mobile device, the sorted transient user profiles on the mobile device in accordance with the selected view; and
displaying, on the display, indicators of distance and direction of the sending devices relative to the mobile device.

12. The method of claim 11, where displaying the sorted transient user profiles on the mobile device further comprises:

displaying user selectable graphical user interface elements in the transient user profiles for communicating with users represented by the transient user profiles.

13. The method of claim 11, where displaying the transient user profiles on the mobile device further comprises:
displaying a user interface element for dynamically increasing or decreasing a number of transient user profiles displayed on the mobile device.

14. The method of claim 11, further comprising:
capturing, by a camera subsystem of the mobile device, a camera view including images of individuals sending the transient user profiles to the mobile device; and
displaying at least a portion of at least one particular transient user profile proximate to the image of an individual that sent the particular transient user profile to the mobile device.

15. The method of claim 11, wherein at least one of the multiple transient user profiles is configured to be deleted from storage of the mobile device after expiration of a specified period of time or after the mobile device moves outside of a geofenced boundary set by the sending device.

16. A system on a mobile device, the system comprising:
a wireless transceiver;
one or more processors;
memory coupled to the one or more processors and configured to store instructions, which, when executed by the one or more processors, causes the one or more processors to perform operations comprising:
determining a sharing event with a set of recipient devices that are in peer-to-peer wireless communication range of the mobile device;
generating, by the mobile device, a transient user profile based on the sharing event, the transient user profile including user profile information comprising one or more data fields labeled with a security tag that defines a subset of recipient devices in the set of recipient devices that are authorized to receive the user profile information, wherein the transient user profile is configured by the mobile device to be deleted from a recipient device of the subset of recipient devices after the recipient device moves a specified distance from the mobile device; and
broadcasting, by the wireless transceiver, the transient user profile to the subset of recipient devices.

17. The system of claim 16, where the sharing event is determined based on a current geographic location of the system.

18. The system of claim 17, where the sharing event is determined by a crossing by the mobile device of a geofenced boundary.

19. The system of claim 16, where generating a transient user profile further comprises:
generating the transient user profile by selecting user information from a master user profile.

20. The system of claim 19, where the master user profile is encrypted and stored on the system.

21. The system of claim 19, where the master user profile is labeled with at least one security tag specifying at least one class of recipients of user information.

22. The system of claim 16, where generating a transient user profile further comprises:
generating the transient user profile from a template user profile with at least one pre-populated data field.

23. The system of claim 22, where the user can specify a geofenced boundary for the template user profile.

24. The system of claim 16, where the transient user profile is configured to restrict sharing of the transient user profile by the one or more recipient devices with other devices according to the security tag carried with the transient user profile.

25. The system as in claim 16, wherein the transient user profile is additionally configured by the mobile device to be deleted from a recipient device of the subset of recipient devices after expiration of a specified period of time or after the recipient device in the subset of recipient devices moves outside a geofenced boundary set by the mobile device.

26. A system comprising:
a display;
one or more processors coupled to the display;
memory coupled to the one or more processors and configured to store instructions, which, when executed by the one or more processors, causes the one or more processors to perform operations comprising:
receiving, by a mobile device during a sharing event, multiple transient user profiles from sending devices in peer-to-peer wireless communication range of the system, at least one of the multiple transient user profiles configured to be deleted from storage of the system after the mobile device moves a specified distance from a sending device;
receiving, by the mobile device, a user input selecting a selected view for the multiple transient user profiles;
sorting the transient profiles based at least in part on the user input;
displaying, on a display of the mobile device, the sorted transient user profiles on the mobile device in accordance with the selected view; and
displaying, on the display, indicators of distance and direction of the sending devices relative to the mobile device.

27. The system of claim 26, where presenting the transient user profiles on the display further comprises:
displaying graphical user interface elements in the transient user profiles for communicating with users represented by the transient user profiles.

28. The system of claim 26, where presenting the transient user profiles on the display further comprises:
displaying a user interface element for dynamically increasing or decreasing the number of transient user profiles presented on the display.

29. The system of claim 26, further comprising a camera subsystem, where the transient user profiles are displayed proximate to corresponding images of individuals captured in a camera view generated by the camera subsystem.

30. The system as in claim 26, wherein at least one of the multiple transient user profiles is configured to be deleted from storage of the system after expiration of a specified period of time or after the mobile device moves outside a geofenced boundary set by the sending device.

* * * * *